United States Patent [19]

Nitz et al.

[11] Patent Number: 5,172,609

[45] Date of Patent: Dec. 22, 1992

[54] GRADEABILITY-BASED SHIFT PATTERN CONTROL FOR AN AUTOMATIC TRANSMISSION

[75] Inventors: Larry T. Nitz, Troy; Susan L. Rees, Clawson, both of Mich.

[73] Assignee: Saturn Corporation, Troy, Mich.

[21] Appl. No.: 844,063

[22] Filed: Mar. 2, 1992

[51] Int. Cl.$^5$ .............................................. B60K 41/06
[52] U.S. Cl. ........................................ 74/866; 74/856; 74/861; 364/424.1
[58] Field of Search ............... 74/856, 861, 865, 866; 364/424.1

[56] References Cited

U.S. PATENT DOCUMENTS

| | | | |
|---|---|---|---|
| 4,258,591 | 3/1981 | Eckert et al. | 74/866 |
| 4,389,910 | 6/1983 | Lockhart | 74/843 |
| 4,660,672 | 4/1987 | Katou | 74/868 X |
| 4,896,565 | 1/1990 | Simonyi et al. | 74/866 |
| 5,035,157 | 7/1991 | Aoki et al. | 74/866 |
| 5,070,746 | 12/1991 | Milunas et al. | 74/866 |

FOREIGN PATENT DOCUMENTS 62-200065 9/1987 Japan ...................... 74/866
3-24362 2/1991 Japan ...................... 74/866

OTHER PUBLICATIONS

07/696,424 U.S. Patent Application, Nitz et al., filed May 6, 1991.

Primary Examiner—Leslie A. Braun
Assistant Examiner—William O. Trousdell
Attorney, Agent, or Firm—Mark A. Navarre

[57] ABSTRACT

An improved shift pattern control in which successive upshifting and downshifting is avoided in conditions of above normal loading by inhibiting upshifting to a speed ratio having insufficient gradeability in relation to a measure of the actual loading. In essence, the control continually monitors the gradeability of the various forward speed ratios of the transmission in relation to a measure of the actual grade load to determine their excess gradeability, and removes from the shift pattern those speed ratios having insufficient excess gradeability. This ensures that the transmission will never be upshifted to a speed ratio that has insufficient gradeability for the given driving condition, thereby eliminating the successive upshifting and downshifting which occurs with conventional shift controls.

5 Claims, 8 Drawing Sheets

GRADEABILITY-BASED SHIFT PATTERN CONTROL FOR AN AUTOMATIC TRANSMISSION

This invention is directed to shift pattern controls for motor vehicle automatic shift transmissions, and more particularly, to a shift pattern control which is certain speed ratios are removed from the shift pattern based on their gradeability.

BACKGROUND OF THE INVENTION

Shifting in a multiple speed ratio motor vehicle automatic transmission is generally initiated in response to the detection of predefined vehicle speed and engine load conditions, referred to collectively as a shift pattern. In a typical application, upshift and downshift vehicle speed thresholds are determined as a function of an engine load indicator, such as throttle position. An upshift to a higher output/input speed ratio is initiated if the actual vehicle speed exceeds the upshift threshold, while a downshift to a lower output/input speed ratio is initiated if the actual vehicle speed is lower than the downshift threshold.

The shift pattern data is empirically determined to achieve various fuel economy and performance requirements under "normal" road load conditions. In an electronic control application, the data is stored in a non-volatile memory array for subsequent retrieval by a powertrain control processor. A drawback of this approach is that the shift pattern developed for "normal" road load may not be appropriate when the vehicle is operated under heavy load conditions. Thus, it is not unusual for several upshifts and downshifts to occur in the course of climbing a steep grade, or while climbing a modest grade at high altitude or with a trailer attached to the vehicle. The successive upshifting and downshifting is not only annoying, but also causes excessive wear and heating of the transmission friction elements.

It has been proposed to modify the normal shift pattern in relation to the amount by which the grade load exceeds normal road load, but such modifications can only reduce the amount of shifting. Also, it has been proposed to make upshifting subject to a determination that the demanded output torque can be met in the upshifted speed ratio, but this is only effective in steady state driving conditions.

SUMMARY OF THE PRESENT INVENTION

The present invention is directed to an improved shift pattern control in which successive upshifting and downshifting is avoided in conditions of above normal loading by inhibiting upshifting to a speed ratio having insufficient gradeability in relation to a measure of the actual loading. The actual loading, referred to herein as the apparent grade load, may be due to a number of conditions such as trailering, steep grade climbing, unusual aerodynamic loading, or any combination thereof.

In essence, the control of this invention continually monitors the gradeability of the various forward speed ratios of the transmission in relation to a measure of the apparent grade load to determine their excess gradeability, and removes from the shift pattern those speed ratios having insufficient excess gradeability. This ensures that the transmission will never be upshifted to a speed ratio that has insufficient gradeability for the given driving condition, thereby eliminating the successive upshifting and downshifting which occurs with conventional shift controls.

Once removed from the shift pattern, the upshift inhibit is maintained until the apparent grade load lessens to the point of sufficient excess gradeability. Thus, the transmission does not upshift if the driver temporarily reduces the engine throttle setting in the course of climbing a grade. An exception to this operation is made in high speed conditions for which the resultant high engine speed during closed throttle operation may be undesirable.

The apparent grade load may be determined with a load equation balancing the transmission output torque against the nominal road load, including acceleration torque, aerodynamic torque and rolling resistance torque. The gradeability of any given speed ratio is determined as a function of the known gradeability at sea level, compensated for barometric pressure.

BRIEF DESCRIPTION OF THE DRAWINGS

FIG. 2 graphically depicts the shift scheduling technique normally employed by the control unit of FIG. 1a.

DETAILED DESCRIPTION OF THE DRAWINGS

Figure 1A:
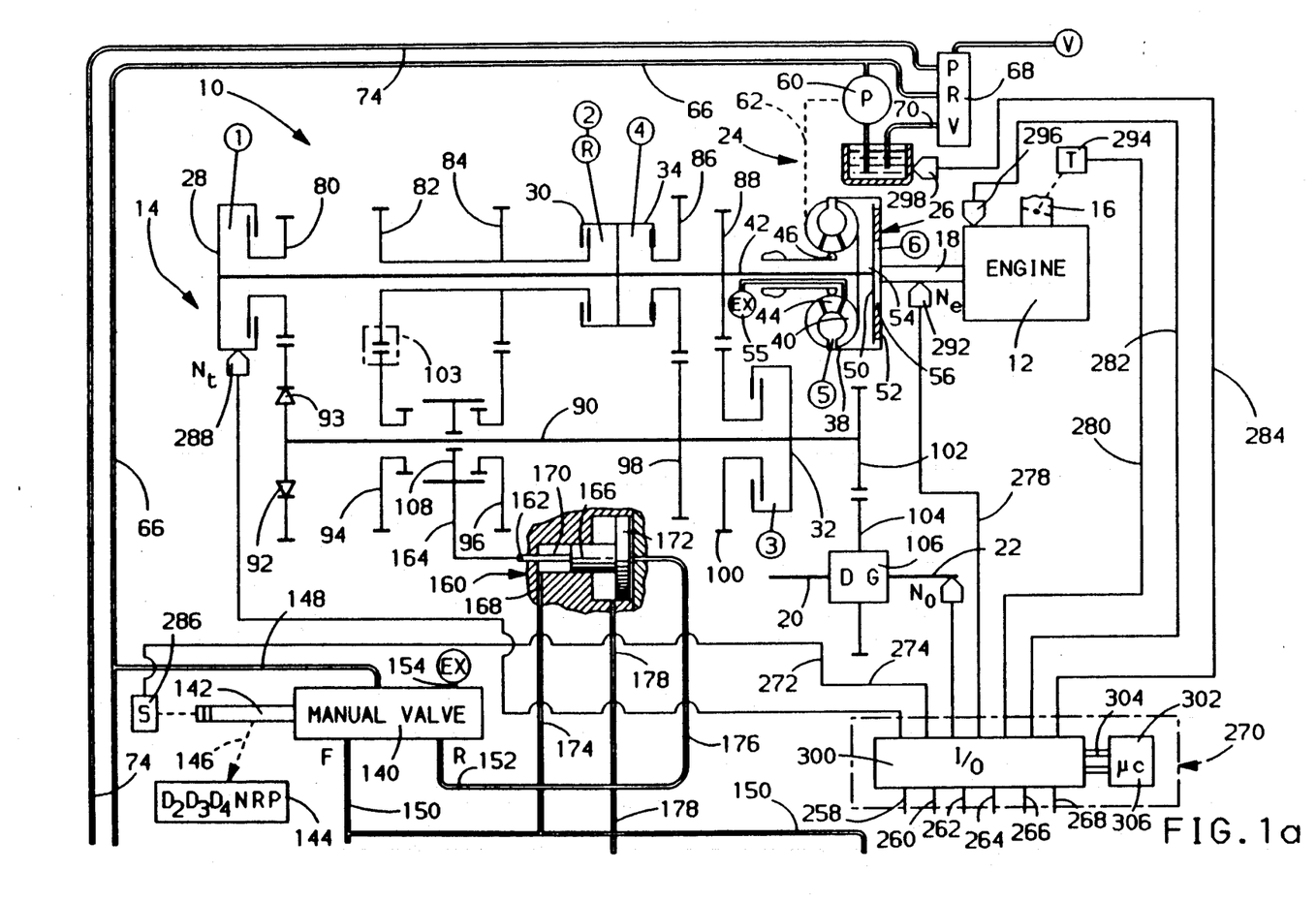
FIGS. 1a-1b schematically depict a computer-based electronic transmission control system according to this invention.
Figure 1B:
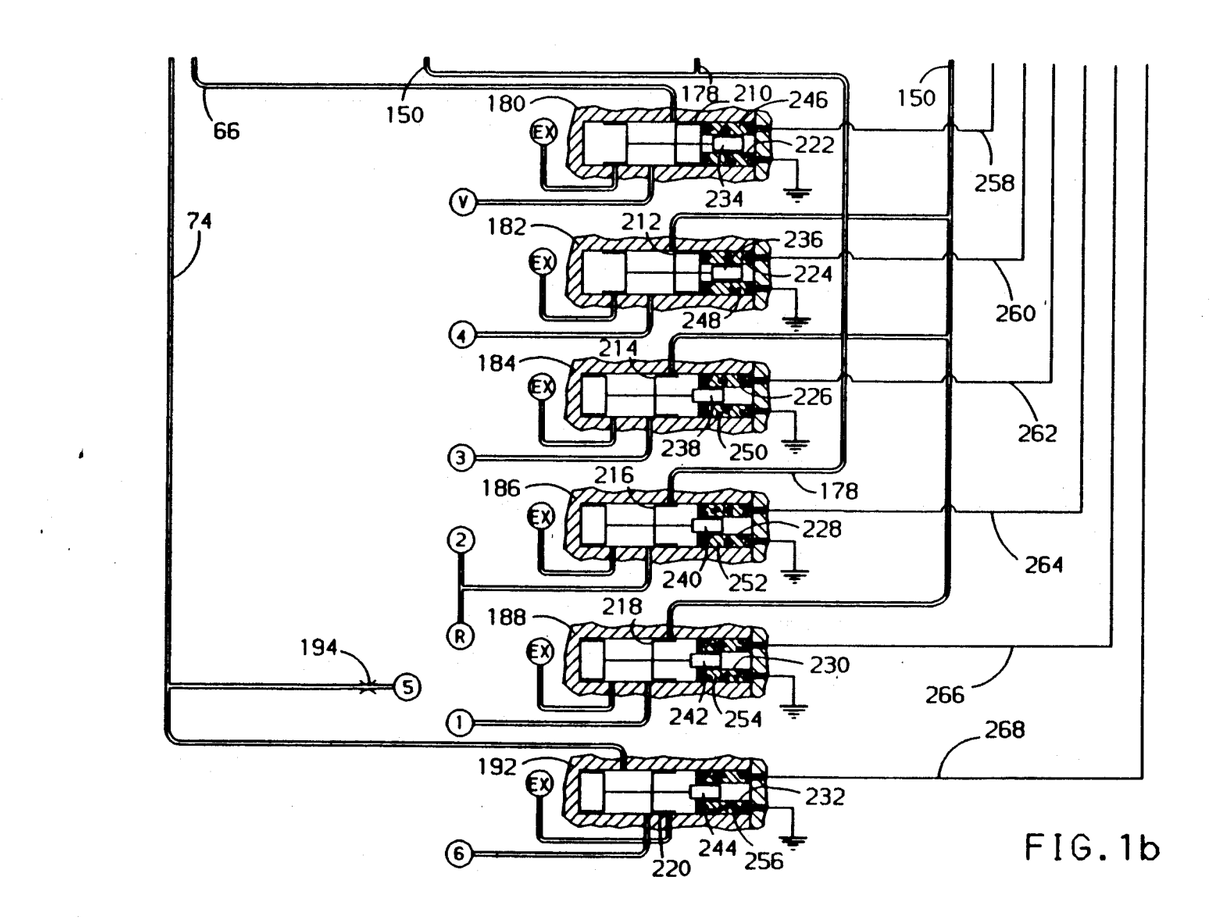

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26, also referred to herein as the torque converter clutch or TCC, comprising a clutch plate 50 connected to rotate with the turbine 40. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the TCC 26 to provide a mechanical drive connection in parallel with the torque converter 24. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56. A fluid exhaust line 55 returns fluid from the torque converter 24 to a cooler (not shown).

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545 to Schuster issued Aug. 3, 1982, and a representative pressure regulator valve is disclosed in the U.S. Pat. No. 4,283,970 to Vukovich issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized by the ratio of the turbine speed $N_t$ to output speed $N_o$. Representative $N_t/N_o$ ratios for transmission 14 are as follows:

First—2.368
Second—1.273
Third—0.808
Fourth—0.585
Reverse—1.880

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68. The fluid valve 190 is controlled to direct fluid pressure from the PRV output line 74 to TCC 26. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1a to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60 or PRV 68, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 184 and 188 receive fluid pressure from the forward output line 150 of manual valve 140, and are controlled to direct variable amounts of such pressure to the clutching devices 34, 32 and 28, as indicated by the circled numerals 4, 3 and 1, respectively. The fluid valve 186 receives fluid pressure from the directional servo output line 178, and is controlled to direct a variable amount of such pressure to the clutching device 30, as indicated by the circled numeral 2 and the circled letter R.

The fluid valve 190 is adapted to alternately connect the release chamber 56 of torque converter 24 to fluid pressure line 74 and exhaust line 192, as indicated by the circled numeral 6. The apply chamber 54 of TCC 26 is supplied with fluid pressure from the fluid pressure line 74 via the orifice 194, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1b, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines.

Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse width modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

With respect to the TCC 26, open converter operation is achieved by deenergizing the coil 256 of fluid valve 190 so that the spool element 220 assumes the position depicted in FIG. 1b. In this case, the fluid pressure in line 74 is directed to the release chamber 56 of torque converter 24, creating a pressure differential across clutch plate 50 which disables engagement of TCC 26. The fluid supplied to release chamber 56 via valve 190 and the fluid supplied to apply chamber 54 via orifice 194 are both exhausted via exhaust line 55 of FIG. 1a.

When it is desired to engage the TCC 26, the coil 256 of valve 190 is pulse width modulated to lessen the fluid pressure in the release chamber 56 of torque converter 24. This creates a pressure differential across clutch plate 50 which moves the friction element 52 into engagement with input shell 38 to initiate TCC engagement.

While the fluid valves 180-190 have been illustrated as spool valves, other types of valves could be substituted therefor. By way of example, valves of the ball and seat type could be used. In general terms, the fluid valves 180-190 may be mechanized with any three-port pulse width modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse width modulation signals, and a microcomputer 302 which communicates with the I/O device 300 via an address-and-control bus 304 and a bi-directional data bus 306. Flow diagrams representing suitable program instructions for execution by microcomputer 302 are depicted in FIGS. 3, 4a-4b, 5, 6 and 7.

Figure 2:
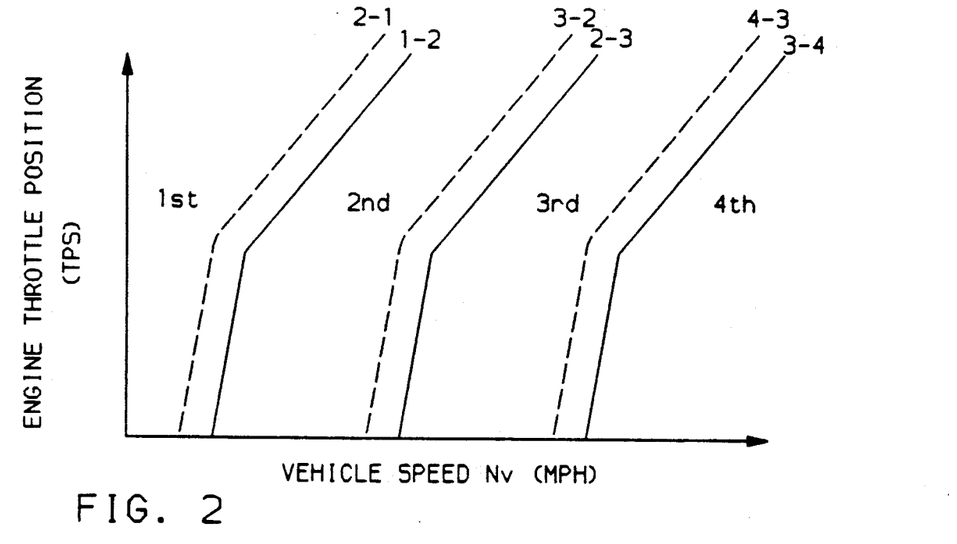

As indicated above, the present invention is directed to an improved shift pattern control. As a background, however, the base shift pattern is graphically depicted for a four-speed transmission in FIG. 2. Referring to FIG. 2, the upshift data is represented by the solid lines 1-2, 2-3 and 3-4, while the downshift data is represented by the broken lines 2-1, 3-2 and 4-3. The pairs of upshift and downshift lines divide the ranges of vehicle speed and engine throttle position into four regions corresponding to the four transmission ratios 1st, 2nd, 3rd and 4th. The separation between the respective pairs of upshift and downshift lines (3-2 and 2-3, for example) provides a degree of hysteresis between upshifts and downshifts involving a given pair of successive speed ratios.

The transmission controller 270 repeatedly compares measured values of vehicle speed and engine throttle position with ratio-dependent data from the table to determine the desired ratio. If the actual ratio is 1st, the controller 270 retrieves an upshift vehicle speed Nup based on the 1-2 upshift line; if the actual ratio is 2nd, the controller 270 retrieves a downshift vehicle speed Ndwn based on the 2-1 downshift line and an upshift vehicle speed Nup based on the 2-3 upshift line; if the actual ratio is 3rd, the controller 270 retrieves a downshift vehicle speed Ndwn based on the 3-2 downshift line and an upshift vehicle speed Nup based on the 3-4 upshift line; and if the actual ratio is 4th, the controller 270 retrieves a downshift vehicle speed Ndwn based on the 4-3 downshift line. In each case, an upshift is scheduled if the actual vehicle speed exceeds the upshift vehicle speed Nup, and a downshift is scheduled if the actual vehicle speed is falls below the downshift vehicle speed Ndwn.

As indicated above, the base shift pattern values are empirically determined to achieve various fuel economy and performance criteria under what is considered to be "normal" road load. However, the present invention recognizes that the base shift pattern may be inappropriate for above normal road loads, and that one or more speed ratios of the normal shift pattern may not have sufficient excess gradeability. Upshifting to such a speed ratio is usually counterproductive unless the grade load happens to lessen shortly after the upshift. If the grade does not lessen, a downshift is typically initiated shortly after the upshift.

The control of this invention overcomes the above-described dilemma by determining the apparent grade load, comparing the grade load to the maximum gradeability of the upper speed ratios (3rd and 4th) of the transmission to determine their excess or reserve gradeability, and preventing an upshift to a speed ratio having insufficient excess gradeability. The inadequate speed ratio(s) are thus effectively removed from the shift pattern insofar as upshifting is concerned. This ensures that the transmission will never be upshifted to a speed ratio that has insufficient gradeability for the given driving condition, thereby eliminating the successive upshifting and downshifting which occurs with conventional shift controls.

Once removed from the shift pattern, the upshift inhibit is maintained until the apparent grade load lessens, and the removed speed ratio possesses sufficient excess gradeability. Hysteresis is employed to lend stability to this function. Since the inadequate speed ratio is effectively removed from the shift pattern, the transmission does not upshift if the driver temporarily reduces the engine throttle setting in the course of ascending a grade. Rather, the current speed ratio is maintained so that when the throttle setting is subsequently increased, downshifting will not be required to continue ascending the grade. An exception to this operation is made in high speed conditions for which the resultant high engine speed during closed throttle operation may be undesirable.

The apparent grade load GL is determined through an application of the load balance expression:

$$GL = Tax - Taccel - Taero - Tro$$

where Tax is the torque delivered to the drive axle of the vehicle, Taccel is the torque required to accelerate the vehicle, Taero is the torque required to overcome the aerodynamic drag of the vehicle, and Tro is the torque required to overcome the rolling resistance of the vehicle.

The acceleration torque Taccel is based on the product of a mass constant and a measure of the vehicle acceleration. The aerodynamic torque Taero is determined as a square function of vehicle speed, and the rolling torque is taken as a constant. The axle torque Tax is based on the product of the current speed ratio and an estimate of the transmission input torque Ti. The input torque Ti, in turn, is determined as a function of the engine manifold absolute pressure (MAP), the engine pumping efficiency (K), a mechanical friction term (Tf), the accessory load torque (TL), and the torque multiplication ratio (Tc) of the torque converter 24 according to the expression:

$$Ti = [(MAP * K) - Tf - TL] * Tc$$

The engine MAP is determined from the sensor 296, while the efficiency K is stored based on previously determined as a function of engine speed Ne, and the load torque term TL is determined by loading indicators. The torque multiplication ratio Tc is determined as a function of the speed ratio Nt/Ne. Factors corresponding to the effects of exhaust gas recirculation (EGR) and instantaneous spark timing may also be taken into account.

Under normal road load conditions, the axle torque Tax will substantially equal the sum of the acceleration, rolling resistance and aerodynamic torques, and the apparent grade load GL will be approximately zero. However, if the apparent road load increases due to trailering, grade climbing or an increase in the vehicle weight, the driver of the vehicle compensates by increasing the axle torque produced by the powertrain. This, in turn, produces an imbalance in the torque expression, resulting in a non-zero grade load term GL.

The maximum gradeability MGRD(n) of a given speed ratio n is empirically determined at sea level, and compensated as a function of barometric pressure to reflect reduced engine output torque at higher altitudes. In turn, the excess or reserve gradeability EXGRD(n) of a given speed ratio n is determined by the difference:

$$EXGRD(n) = MGRD(n) - GL$$

Figure 3:
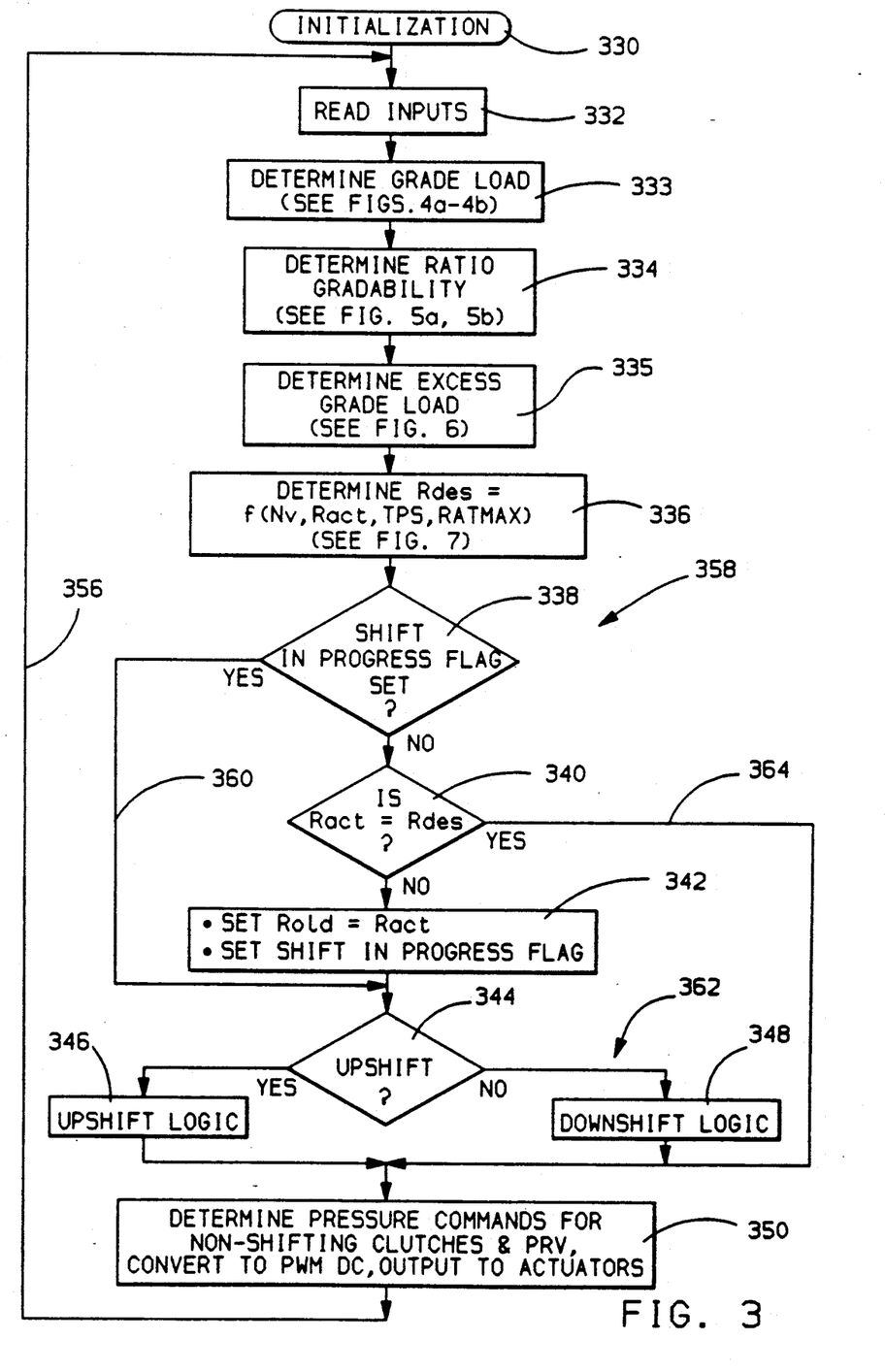
FIGS. 3, 4a-4b, 5, 6 and 7 depict flow diagrams executed by the computer-based controller of FIG. 1a in carrying out the control of this invention.

The flow diagrams of FIGS. 3, 4a–4b, 5, 6 and 7 represent program instructions to be executed by the microcomputer 302 of control unit 270 in mechanizing the ratio shifting control of this invention. The flow diagram of FIG. 3 represents a main or executive program which calls various subroutines for executing particular control functions as necessary. The flow diagrams of FIGS. 4a–4b and 5-7 represent the functions performed by those subroutines which are pertinent to the present invention.

Referring to the main loop program of FIG. 3, the reference numeral 330 designates a set of program instructions executed at the initiation of each period of vehicle operation for initializing the various tables, timers, etc., used in carrying out the control functions of this invention. Following such initialization, the instruction blocks 332-354 are repeatedly executed in sequence, as designated by the flow diagram lines connecting such instruction blocks and the return line 356. Instruction block 332 reads and conditions the various input signals applied to I/O device 300 via the lines 272-285, and calculates various terms used in the control algorithms, including the input torque Ti, the torque variable Tv and the speed ratio No/Ni.

Figure 4A:
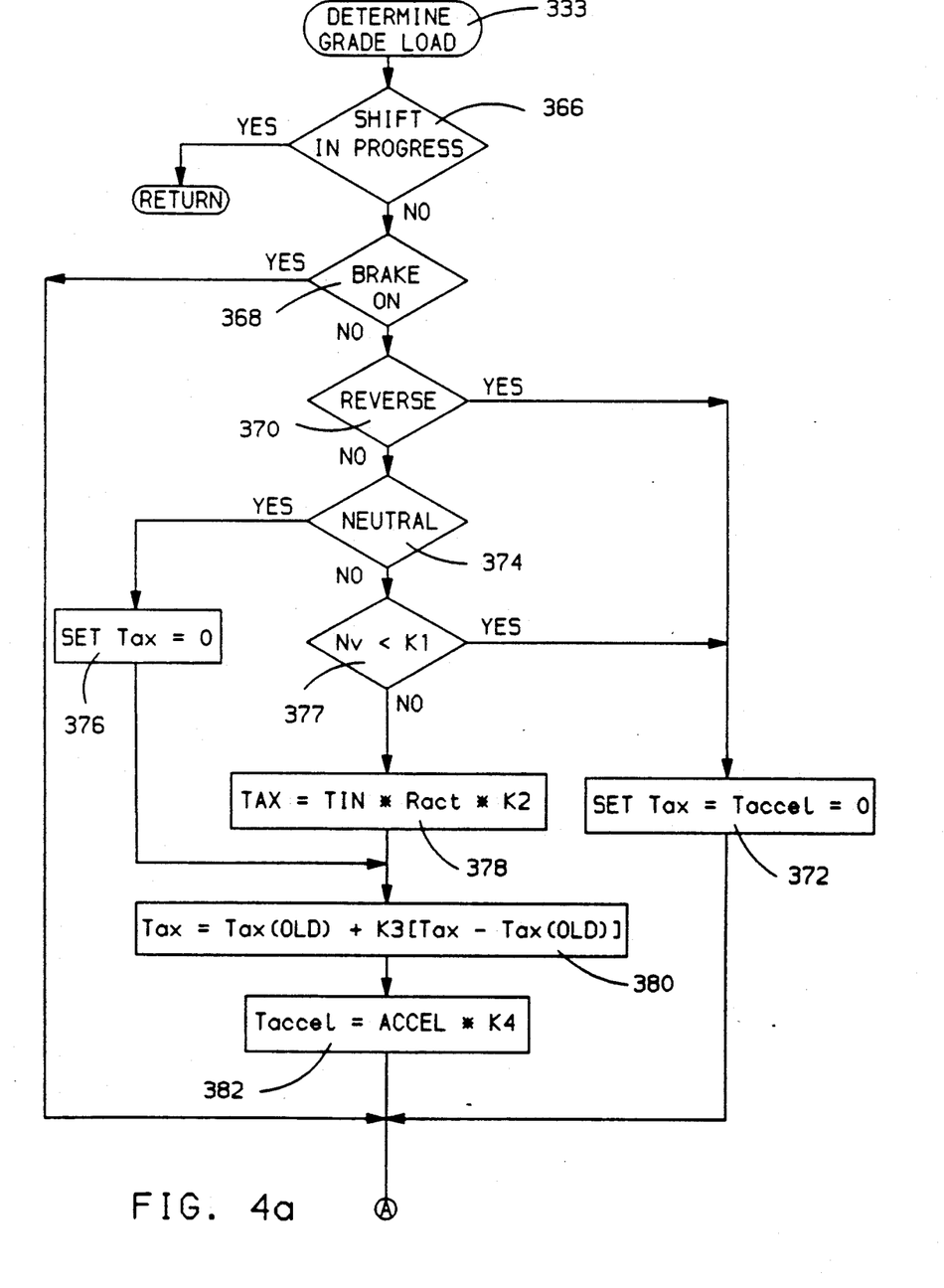
Figure 4B:
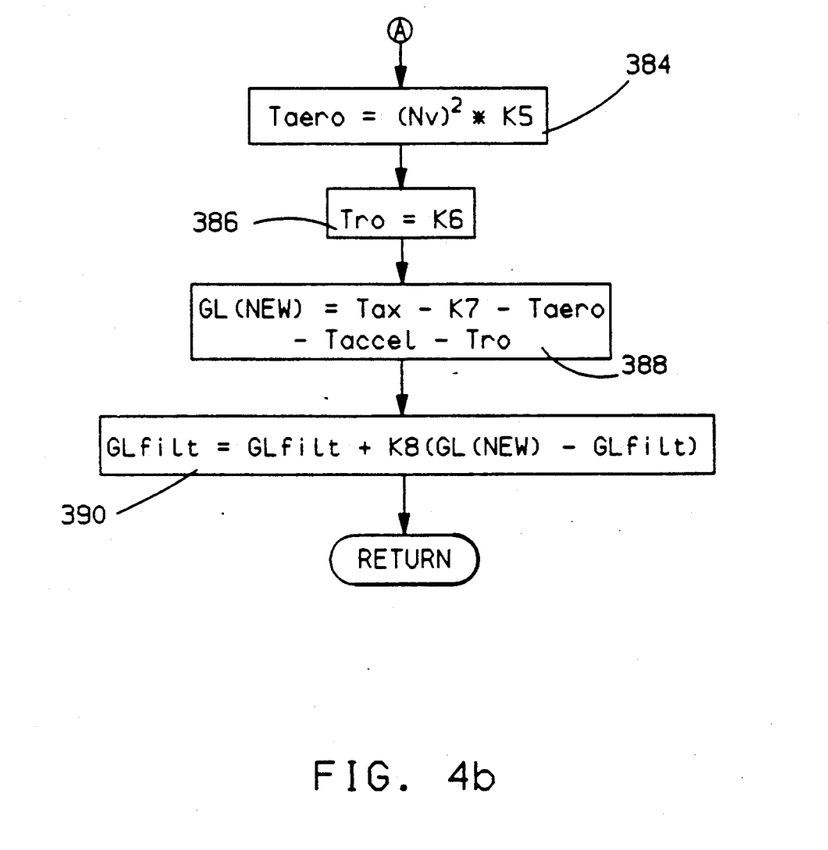

The block 333 determines the grade load GL, as described above, and is set forth in detail in the flow diagram of FIGS. 4a–4b, as indicated. The block 334 determines the maximum gradeability of the 3rd and 4th speed ratios, and is set forth in detail in the flow diagram of FIG. 5, as indicated. The block 335 determines the excess gradeability of the 3rd and 4th speed ratios, and is set forth in detail in the flow diagram of FIG. 6, as indicated. The block 336 determines the desired speed ratio, Rdes, in accordance with a number of inputs including present ratio Ract, throttle position TPS, vehicle speed Nv, manual valve position, and the excess gradeability considerations, and is set forth in detail in the flow diagram of FIG. 7, as indicated.

The blocks designated by the reference numeral 358 include the decision block 338 for determining if a shift is in progress, as indicated by the "SHIFT IN PROGRESS" flag; the decision block 340 for determining if the actual speed ratio Ract (that is, No/Nt) is equal to the desired speed ratio Rdes determined at instruction block 336; and the instruction block 342 for setting up the initial conditions for a ratio shift. The instruction block 342 is only executed when decision blocks 338 and 340 are both answered in the negative. In such case, instruction block 342 serves to set the old ratio variable (Rold) equal to Ract and to set the "SHIFT IN PROGRESS" flag. If a shift is in progress, the execution of blocks 340 and 342 is skipped, as indicated by the flow diagram line 360. If no shift is in progress, and the actual ratio equals the desired ratio, the execution of instruction block 342 and the blocks designated by the reference numeral 362 is skipped, as indicated by the flow diagram line 364.

The blocks designated by the reference numeral 362 include the decision block 344 for determining if the shift is an upshift or a downshift; the instruction block 346 for developing pressure commands for the on-coming and off-going clutches if the shift is an upshift; and the instruction block 348 for developing the pressure commands for the on-coming and off-going clutches if the shift is a downshift. Instruction block 350 determines pressure commands for the PRV and the non-shifting clutches, converts the commands to a PWM duty cycle based on the operating characteristics of the various actuators, and energizes the actuator coils accordingly. The development of suitable pressure commands and PWM duty cycle control given a desired speed ratio is described in detail in the U.S. Pat. No. 4,653,350 to Downs et al., issued on Mar. 31, 1987, and assigned to General Motors Corporation.

Referring to the grade load determination flow diagram of FIGS. 4a–4b, the decision block 366 is first executed to determine if a shift is in progress. If so, the remainder of the routine is skipped. If the service brakes are depressed, as determined at block 368, the execution of blocks 370-382 is skipped to freeze the current values of Tax and Taccel. If the transmission range selector 142 is in Reverse, as determined at block 370, the block 372 is executed to set the axle and acceleration torque terms Tax and Taccel to zero. If the range selector 142 is in Neutral, as determined at block 374, the block 376 is executed to set the axle torque term Tax to zero. The axle and acceleration torque terms Tax and Taccel are also zeroed if the vehicle speed Nv is less than a predefined value K1, such as 20 MPH, as determined at block 377.

The blocks 378-382 determine the non-zero values of the axle and acceleration torque terms Tax and Taccel. The axle torque Tax is determined according to the expression:

$$Tax = Tin * Ract * K2$$

and then subjected to a first order lag filter, as indicated at block 380. The acceleration torque term is determined according to the expression:

$$Taccel = K4 * d(Nv)/dt$$

where K4 represents the nominal vehicle weight and d(Nv)/dt represents the acceleration of the vehicle.

The aerodynamic and rolling resistance torque terms Taero and Tro are then determined at blocks 384 and 386 according to the respective expressions:

$$Taero = Nv^2 * K5,$$

and $Tro = K6$

The block 388 is then executed to determine the new grade load term GL(NEW) according to the expression:

$$GL(NEW) = Tax - K7 - Taero - Taccel - Tro$$

The block 390 is then executed to develop a filtered grade load term GLfilt according to the expression:

$$GLfilt = GLfilt + K8(GL(NEW) - GLfilt)$$

where K8 is a gain constant.

Figure 5:
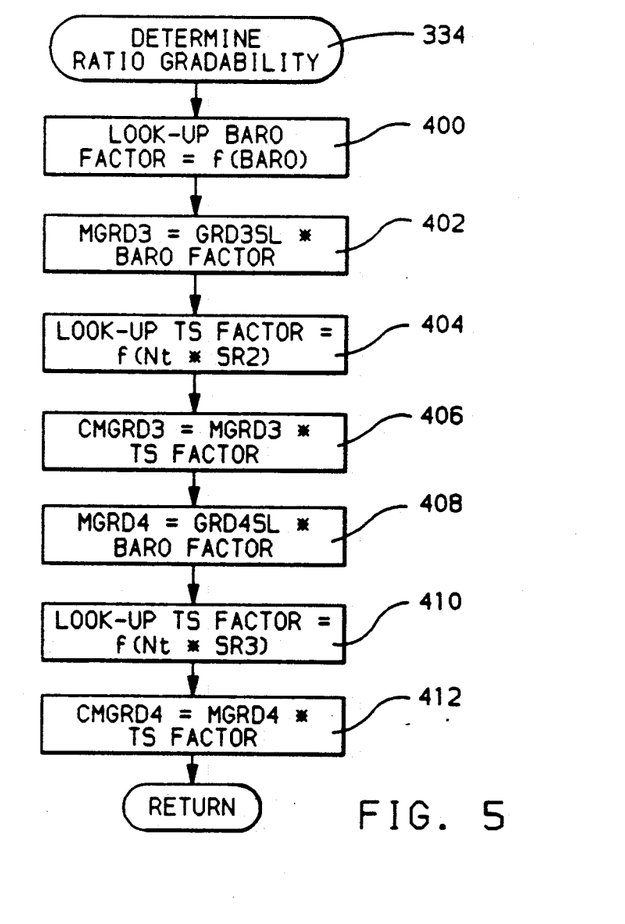

Referring to the ratio gradeability flow diagram of FIG. 5, the block 400 is first executed to determine a compensation factor BARO FACTOR based on the ambient barometric pressure, as derived from MAP sensor 296. The maximum gradeability of the various transmission speed ratios at sea level is known, and the BARO FACTOR is applied to the sea level values (GRDSL3, GRDSL4) for the 3rd and 4th speed ratios at blocks 402 and 408, respectively, to determine the maximum gradeability (MGRD3, MGRD4) of such speed ratios for the altitude at which the vehicle is operating.

As indicated above, the transmission is permitted to upshift under high speed conditions for which the resultant high engine speed during closed throttle operation may be undesirable, even though there is no reserve gradeability in the upshifted speed ratio. To this end, the maximum gradeability values MGRD3, MGRD4 determined at blocks 402 and 408 are multiplied by a turbine speed factor (TS FACTOR) to artificially increase such values with increasing turbine speed Nt. Referring to block 404, the turbine speed factor for 3rd gear is determined as a function of the product (Nt * SR2)—that is, the turbine speed which would occur if the transmission were maintained in the 2nd speed ratio (SR2). Referring to block 410, TS FACTOR for 4th gear is determined as a function of the product (Nt * SR3)—that is, the turbine speed which would occur if the transmission were maintained in the 3rd speed ratio (SR3). The 3rd gear TS FACTOR is applied to MGRD3 at block 406 to form a compensated 3rd gear maximum gradeability term CMGRD3, and the 4th gear TS FACTOR is applied to MGRD4 at block 412 to form a compensated 4th gear maximum gradeability term CMGRD4.

Figure 6:
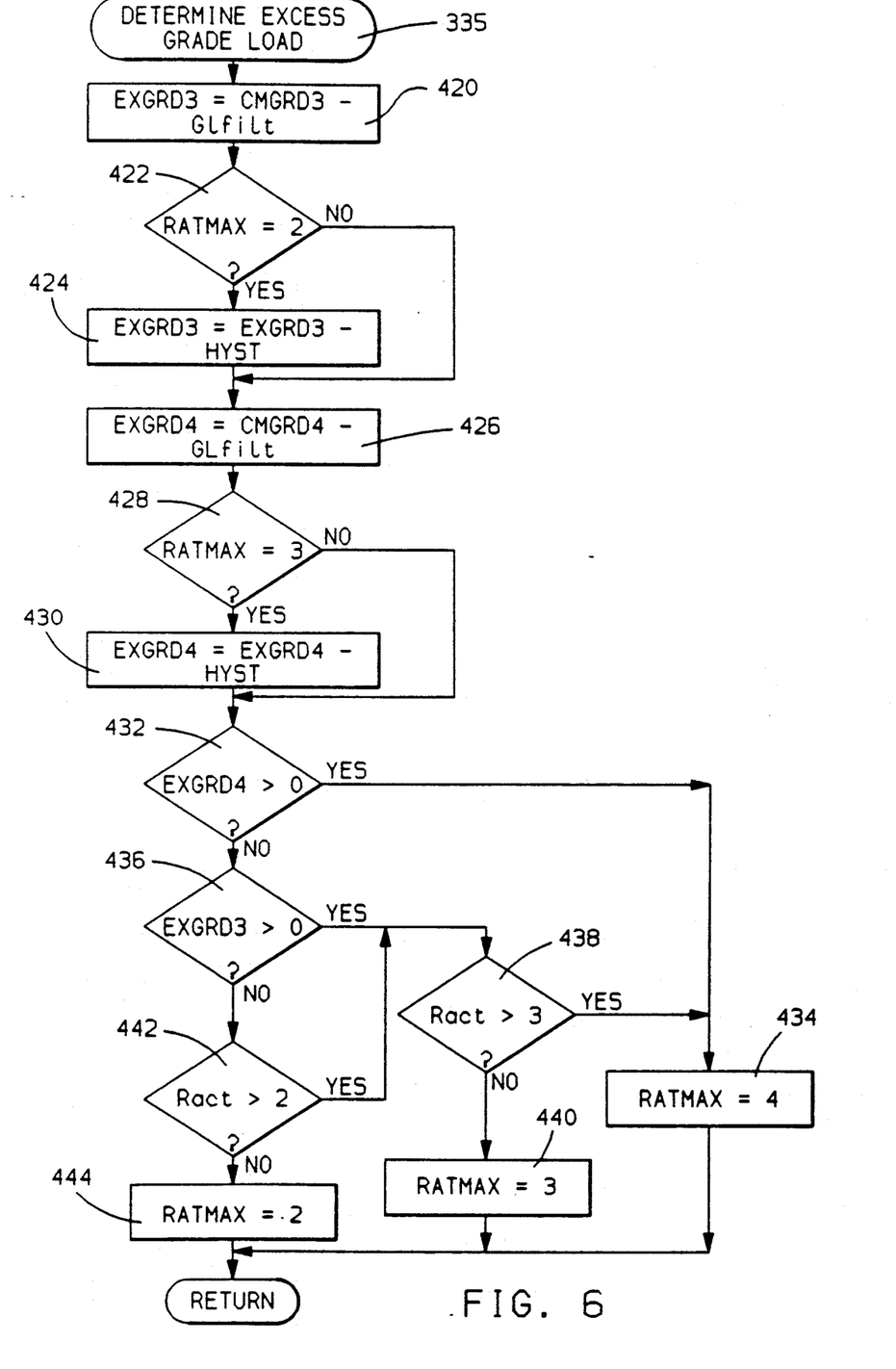

Referring to the excess gradeability flow diagram of FIG. 6, the block 420 is first executed to determine the excess or reserve gradeability of the 3rd speed ratio, EXGRD3, according to the difference: (CMGRD3 - GLfilt). If the ratio is already limited to 2nd gear, as determined by the status of RATMAX at block 422, the block 424 is executed to decrease the 3rd gear excess gradeability term EXGRD3 by a hysteresis creating term HYST. This reduces the likelihood of repeated shifting when the excess gradeability of 3rd gear is at or near its acceptable gradeability threshold.

In a similar manner, the block 426 is executed to determine the excess or reserve gradeability of the 4th speed ratio, EXGRD4, according to the difference: (CMGRD4 - GLfilt). If the ratio is already limited to 3rd gear, as determined by the status of RATMAX at block 428, the block 430 is executed to decrease the 4th gear excess gradeability term EXGRD4 by the hysteresis creating term HYST. Again, this reduces the likelihood of repeated shifting when the excess gradeability of 4th gear is at or near its acceptable gradeability threshold.

As indicated above, the term RATMAX is used to limit the top speed ratio of the transmission in above normal grade load conditions, effectively producing manual pulldown operation. The term RATMAX is initially set equal to the top gear, four in the illustrated embodiment. If the 4th speed ratio is to be removed from the normal pattern, the term RATMAX is set to three; if the 3rd speed ratio is also to be removed, RATMAX is set to two, its lowest possible value.

In the illustrated embodiment, the third and/or fourth speed ratios are removed if they cannot provide excess or reserve gradeability. However, a speed ratio is not removed unless the actual ratio is already less than or equal to the next lower speed ratio. If EXGRD4 is greater than zero, as determined at block 432, block 434 is executed to set RATMAX to four, indicating that operation is 4th gear is permitted. If not, block 436 is executed to determine if EXGRD3 is greater than zero. If so, and the actual ratio is already less than or equal to 3rd, as determined at block 438, the block 440 is executed to set RATMAX to three. Otherwise, RATMAX is maintained at a value of four. If EXGRD3 is less than or equal to zero, and the actual ratio is already less than or equal to 2nd, as determined at blocks 436 and 442, the block 444 is executed to set RATMAX to two. If the actual ratio is 3rd, as determined by blocks 438 and 442, RATMAX is set to three at block 440.

Figure 7:
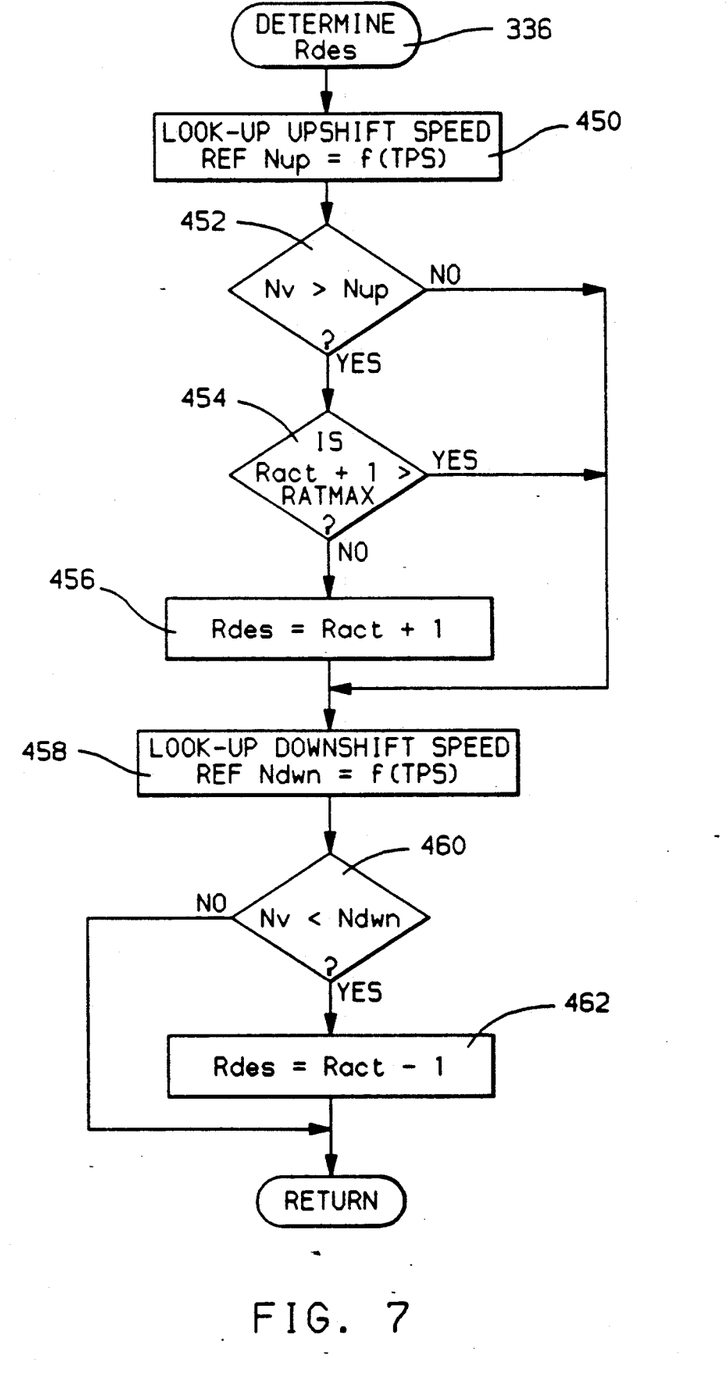

Referring to the desired speed ratio flow diagram of FIG. 7, the block 450 is first executed to look-up an upshift vehicle speed Nup as a function of engine throttle position TPS. If the vehicle speed Nv exceeds the upshift speed Nup, as determined at block 452, the block 454 is executed to determine if the upshifted gear (Ract + 1) is higher than RATMAX. If not, block 456 is executed to initiate an upshift by incrementing the desired speed ratio Rdes; if so, the execution of block 456 is skipped to inhibit the upshift.

The block 458 is then executed to look-up a downshift vehicle speed Ndwn as a function of engine throttle position TPS. If the vehicle speed Nv is less than the downshift speed Ndwn, as determined at block 460, the block 462 is executed to initiate a downshift by decrementing the desired speed ratio Rdes.

Thus, the control of this invention inhibits upshifting, but does not initiate downshifting. Instead, downshifting is initiated in accordance with the normal shift pattern depicted in FIG. 2. Nevertheless, various other controls, as referenced by way of background, may be provided to adjust the shift pattern as a function of the detected grade load. By entirely removing certain speed ratios from the shift pattern, the control of the present invention provides improved shift stability compared to the base shift pattern when the vehicle loading is excessive, regardless of the reason for the excessive load. This improves the driveability of the vehicle and also prevents excessive wear and heating of the transmission friction elements due to successive upshifting and downshifting.

While this invention has been described in reference to the illustrated embodiments, it is expected that various modifications will occur to those skilled in the art, and it should be understood that methods of operation incorporating such modifications may fall within the scope of this invention which is defined by the appended claims.

The embodiments of the invention in which an exclusive property or privilege is claimed are defined as follows:

1. In a motor vehicle including an engine and a transmission providing a plurality of forward speed ratios through which the engine may drive the vehicle, a method of operation comprising the steps of:

initiating upshifting and downshifting between said speed ratios in response to a comparison of measured load condition parameters with predetermined load condition parameters defined by a base shift pattern;

determining an apparent grade load indication in relation to an imbalance between engine produced torque and an estimate of the torque required to achieve a current driving condition of the vehicle;

determining maximum gradeability indications corresponding to a maximum grade load which can be overcome with said forward speed ratios;

comparing said apparent grade load with said maximum gradeability indications to form an indication of excess gradeability of each such speed ratio; and overriding said base shift pattern when an excess gradeability indication for a respective speed ratio is less than a reference value by inhibiting upshifting to such respective speed ratio.

2. The method of operation set forth in claim 1, including the step of:

increasing a maximum gradeability indication for a given speed ratio in relation to an estimate of a transmission input speed which would occur in a successively lower speed ratio, so as to prevent overriding of said base shift pattern which would produce undesirably high input speed during engine braking conditions.

3. The method of operation set forth in claim 1, wherein the step of determining maximum gradeability indications includes the steps of:

retrieving predetermined gradeability values corresponding to the maximum gradeability of said forward speed ratios at sea level; and adjusting said gradeability values in relation to an indication of ambient barometric pressure to form said maximum gradeability indications.

4. In a motor vehicle including an engine, a transmission providing a plurality of successively increasing forward speed ratios through which the engine may drive the vehicle, a base shift pattern control for initiating upshifting and downshifting between said speed ratios in response to a comparison of measured load condition parameters with predetermined load condition parameters, and a range selector positionable by a vehicle driver to exclude at least one specified speed ratio from said base shift pattern, a method of operation comprising the steps of:

determining an apparent grade load indication in relation to an imbalance between engine produced torque and an estimate of the torque required to achieve a current driving condition of the vehicle;

determining maximum gradeability indications corresponding to a maximum grade load which can be overcome with said forward speed ratios;

comparing said apparent grade load with said maximum gradeability indications to form an indication of excess gradeability of each such speed ratio; and overriding said base shift pattern when an excess gradeability indication for a respective speed ratio is less than a reference value by inhibiting upshifting to such respective speed ratio.

5. Control apparatus for a motor vehicle including an engine and a transmission providing a plurality of forward speed ratios through which the engine may drive the vehicle, the control apparatus comprising:

means for initiating upshifting and downshifting between said speed ratios in response to a comparison of measured load condition parameters with predetermined load condition parameters defined by a base shift pattern;

means for determining an apparent grade load indication in relation to an imbalance between engine produced torque and an estimate of the torque required to achieve a current driving condition of the vehicle;

means for determining maximum gradeability indications corresponding to a maximum grade load which can be overcome with said forward speed ratios;

means for comparing said apparent grade load with said maximum gradeability indications to form an indication of excess gradeability of each such speed ratio; and means for overriding said base shift pattern when an excess gradeability indication for a respective speed ratio is less than a reference value by inhibiting upshifting to such respective speed ratio.

* * * * *